United States Patent Office 2,981,718
Patented Apr. 25, 1961

2,981,718
PROCESS FOR MAKING POLYVINYLBUTYRACE-
TAL RESINS WHICH ARE CAPABLE OF BEING
CAST

Joseph Heckmaier and Alois Stoll, Burghausen, Germany, assignors to Wacker-Chemie G.m.b.H., Munich, Germany, a firm of Germany No Drawing. Filed Feb. 9, 1959, Ser. No. 791,791
Claims priority, application Germany Sept. 21, 1956
3 Claims. (Cl. 260—73)

The present invention relates to a process for producing polyvinylbutyracetal resins which are capable of being poured or cast and more particularly to the production of resins of this type which are suitable for casting foils.

Two processes are generally used for producing polyvinylbutyracetals. In one of the conventional processes polyvinyl alcohol is condensed with butyraldehyde in an aqueous medium. In the second conventional process polyvinylester, preferably polyvinylacetate is simultaneously or separately saponified and acetalized in organic solvents in the presence of strong acid catalysts.

The conventional processes are not satisfactory. It is particularly difficult to obtain within an economic reaction time acetals with the second process described above which acetals have a relatively great content of residual polyvinyl alcohol and a very low content of residual polyvinylester. A great disadvantage inherent in the conventional processes is the usually considerable discoloration of the products, if the reaction has been effected without adding water. The use of these discolored acetals is limited. Discoloration can be reduced by reducing the acid concentration, reducing the reaction temperature, or by adding water whereby the reaction time is considerably increased.

Another disadvantage of the acetals produced according to the second conventional process is that the acetals obtained thereby, when in dry state, produce, almost without any exception, strong gelatinous solutions in solvent media which consist of mixtures of aliphatic alcohols with aliphatic esters, if 20% to 30% solutions are prepared for making safety glass foils.

These gelatinous soluble polyvinylacetals are always obtained if the initial concentration of the polyvinylester in the solution comprising the reaction mixture amounts to approximately 15% to 20%, which is the commonly used concentration. Such products are utterly useless for casting foils and can be worked into sheet materials on rolls only.

We have now found that the above disadvantages which are inherent in the methods described above for the preparation of polyvinylacetals may be eliminated by carrying out the saponification of the polyvinylester in a non-aqueous reaction medium comprising a water-miscible lower aliphatic alcohol until the partially saponified polyvinylester formed separates from the solvent medium in the form of a gel, continuing the saponification in the reaction medium without altering the reaction conditions until the residual acyl groups remaining on the saponified polyvinylester have been reduced to the desired value, and thereafter adding water and butyraldehyde to the reaction medium and condensing the saponified polyvinylester and butyraldehyde to form the desired polyvinylbutyral.

Suitable catalysts which may be employed in the saponification reaction are preferably strong acid catalysts such as sulfuric acid and phosphoric acid, for example. To effect the saponification in a reasonably short and therefore economical reaction time the catalyst concentration is preferably maintained at from 5% to 7% by weight of the polyvinylester undergoing saponification.

The economics of the process of the present invention are such that an over-all reaction time of only from 10 to 11 hours is required for the production of a polyvinylbutyral resin suitable for the prodution of safety glass and containing, for example, 78% acetal groups, 1% acetate groups and 21% unreacted hydroxy groups. A solution of the foregoing polyvinylbutyral, obtained in accordance with the process of the present invention, prepared by dissolving the resin in the usual solvent mixtures employed remains clear and colorless and the dissolved resin can be readily precipitated from solution as a fine granular powder by adding water to the solution at room temperature. No other precipitating agents are necessary or required in order to obtain a powdered, granular precipitate.

The separation of the saponification product in gel-like form during the saponification reaction described is usually observed when employing a reaction temperature of about 65° C. after the reaction has proceeded for from 2½ to 3 hours.

The time element involved in the continuation of the saponification reaction after the separation of the reaction product in gel-like form is observed will vary depending upon the ultimate composition desired in the polyvinylbutyral which is formed when the saponification reaction product is then reacted with butyraldehyde. The longer the saponification reaction is continued after gel formation is observed, the lower the residual acetate content in the product. For a residual acetate content of 0.5% to 1% the saponification is continued for from 2 to 2½ hours after the product separates as a gel. Under a given set of reaction conditions, as described, it has been observed that the polyvinylbutyrals formed when saponification is halted at the gel stage without continuing the saponification beyond the point where the gel separates will contain as high as 15% and more of residual acetate groups.

It is preferable that no water be added to the reaction mixture after the gel stage of the saponification reaction is reached since the velocity of the saponification reaction in the solvent medium is much greater when no water is present. The increased reaction rate reduces the overall reaction time by several hours while at the same time any discoloration of the solution is avoided.

The amount of water added in accordance with the process of the present invention when the acetalization reaction is carried out depends upon the concentration of acid present in the reaction medium in which the saponification takes place. When the acid catalyst is present in an amount of from 5% to 7% it has been found that the addition from 13% to 16% of water on the weight of the solvent present is satisfactory in preventing the development of color in the product when in solution. Under these reaction conditions the subsequent acetalization reaction can be effected in from 5 to 6 hours.

It was quite surprising and certainly could not have been anticipated that reaction mixtures containing a relatively high concentration, say 22% to 30% and higher, of a polyvinylester, and preferably 23% to 26%, would, upon saponification and subsequent acetalization in accordance with the process described, yield polyvinylbutyrals which could be dissolved in alcohols and in mixtures of alcohols and esters in concentrations as high as 20% to 30%, with or without a plasticizer, to yield perfectly clear solutions which are not only free of gels but of other undissolved particles which impair their flow characteristics. The polyvinylbutyrals obtained in accordance with this invention are satisfactorily employed in film-forming and in foil-forming operations by either casting or rolling techniques.

The process according to the invention permits the production of undiscolored polyvinylbutyral resins, which are particularly suitable for making cast foils and have a very low content of residual acetate groups, in considerably shorter and more economic reaction times than are needed in the conventional processes for making these acetal resins.

*Example I*

200 parts by weight polyvinylacetate were dissolved in 600 parts by weight methanol and heated to 65° C. for three hours under reflux with 12 parts by weight concentrated sulfuric acid. The partly saponified polyvinylester formed separated as a gel after this time was further saponified for one and one half hours at the same temperature. Thereupon 130 parts by weight water and 83.5 parts by weight butyraldehyde were added and the saponified product acetalized for five hours. The clear, undiscolored reaction product in solution was precipitated at room temperature by adding water and the acetal obtined was washed until free of acid.

The product obtained had the following composition: 74.5% polyvinylbutyral, 2.4% polyvinylacetate, and 23.1% residual polyvinylalcohol. The product was clear and colorless and soluble in alcohols and alcohol-ester mixtures.

*Example II*

870 parts by weight of a 23% solution of polyvinylacetate in methanol were saponified at 65° C. during two and one half hours with 12 parts by weight concentrated sulfuric acid. The separated gel of partly saponified ester was further saponified for two and one half hours. After addition of 100 parts by weight water and 83.5 parts by weight butyraldehyde condensation was effected for six hours and the process continued as in Example I. The composition of the obtained resin was as follows: 77.5% polyvinylbutyral, 0.5% polyvinylacetate, 22.0% polyvinyl alcohol. The flow characteristics of a 20% solution of the product in methanol-ethylacetate mixtures, if desired with the addition of a softener, are unchanged even after several months of storage. The so-obtained acetal solution is highly suitable for casting of optically clear foils adapted for making safety glass.

*Example III*

1200 parts by weight of a 25% solution of polyvinylacetate in ethanol were heated to 65° C. for three hours with 18 parts by weight concentrated sulfuric acid. The partly saponified polyvinylester which separated as a gel after this time was then further saponified for one half hour. Thereupon 135 parts by weight water and 125 parts by weight butyraldehyde were added and the mixture was acetalized for five hours.

The so produced acetal had the following composition: 68.8% polyvinylacetal, 10.4% polyvinylacetate, and 19.7% polyvinyl alcohol.

The present application is a continuation-in-part application of our application, Serial No. 679,089, filed August 19, 1957.

We claim:

1. In a process for the production of polyvinylbutyral substantially free of color by the saponification of polyvinyl acetate in a non-aqueous lower aliphatic alcohol containing from 5% to 7% of sulfuric acid on the weight of the polyvinyl acetate and the subsequent acetalization of the polyvinyl alcohol formed with butyraldehyde in the saponification reaction medium, the steps which comprise carrying out the saponification in said non-aqueous lower aliphatic alcohol at a temperature of about 65° C. until the residual unsaponified acetate groups on the polyvinyl alcohol formed are at most 1% by weight, adding from 13% to 16% by weight of water on the weight of the lower alcohol present to the acid lower aliphatic alcohol solution of polyvinyl alcohol obtained together with an amount of butyraldehyde about equal in weight to the polyvinyl alcohol formed and reacting the polyvinyl alcohol with the added butyraldehyde in said acid reaction medium for 5 to 6 hours at a temperature of about 65° C. to form polyvinylbutyral having about 19% to 23% free hydroxyl groups.

2. Process in accordance with claim 1 wherein the lower aliphatic alcohol is methanol.

3. Process in accordance with claim 1 wherein the lower aliphatic alcohol is ethanol.

References Cited in the file of this patent

UNITED STATES PATENTS

| | | |
|---|---|---|
| 2,400,957 | Stamatoff | May 28, 1946 |
| 2,478,431 | Stamatoff | Aug. 3, 1949 |
| 2,496,480 | Lavin et al. | Feb. 7, 1950 |

FOREIGN PATENTS

| | | |
|---|---|---|
| 1,025,149 | Germany | Feb. 27, 1958 |